US011274770B2

(12) United States Patent
Marshall et al.

(10) Patent No.: US 11,274,770 B2
(45) Date of Patent: Mar. 15, 2022

(54) MONOLITHIC FLUID TRANSFER TUBE

(71) Applicant: United Technologies Corporation, Farmington, CT (US)

(72) Inventors: Travis H. Marshall, West Hartford, CT (US); Adam Mocarski, New Britain, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 385 days.

(21) Appl. No.: 16/388,316

(22) Filed: Apr. 18, 2019

(65) Prior Publication Data

US 2020/0332921 A1 Oct. 22, 2020

(51) Int. Cl.
*F16L 3/01* (2006.01)
*F16L 21/02* (2006.01)

(52) U.S. Cl.
CPC .................. *F16L 3/01* (2013.01); *F16L 21/02* (2013.01)

(58) Field of Classification Search
CPC .. F16L 3/01; F16L 21/02; F01D 9/065; F01D 11/005
USPC ......................................................... 285/61
See application file for complete search history.

(56) References Cited

U.S. PATENT DOCUMENTS

| | | | |
|---|---|---|---|
| 3,850,544 A * | 11/1974 | Ciokajlo | F01D 17/162 415/149.4 |
| 4,577,891 A | 3/1986 | Fielding | |
| 5,236,035 A * | 8/1993 | Brisco | E21B 33/05 166/70 |
| 6,102,577 A * | 8/2000 | Tremaine | F01D 25/186 384/493 |
| 8,196,934 B2 | 6/2012 | Do | |
| 8,713,944 B2 | 5/2014 | Bleeker | |
| 8,944,749 B2 * | 2/2015 | Durocher | F01D 9/065 415/1 |
| 9,140,453 B2 | 9/2015 | Kojovic et al. | |
| 9,222,604 B2 | 12/2015 | Martensson et al. | |
| 9,606,024 B2 * | 3/2017 | Marocchini | G01M 15/14 |
| 9,869,204 B2 | 1/2018 | Winn et al. | |
| 9,982,600 B2 | 5/2018 | Socha et al. | |
| 2009/0079185 A1 * | 3/2009 | Carbines-Evans | F01D 9/065 285/123.1 |
| 2010/0275572 A1 | 11/2010 | Durocher et al. | |

(Continued)

OTHER PUBLICATIONS

EP search report for EP20158053.7 dated Sep. 30, 2020.
EP search report for EP20158072.7 dated Sep. 1, 2020.

*Primary Examiner* — Muhammad Ijaz
(74) *Attorney, Agent, or Firm* — Getz Balich LLC

(57) ABSTRACT

An assembly is provided for a piece of rotational equipment. This assembly includes a first structure, a second structure and a fluid transfer assembly. The first structure is configured with an aperture. The second structure is configured as or otherwise includes a port. The fluid transfer assembly includes a fluid conduit and a slider element. The fluid conduit is configured as a monolithic tubular body that includes a first conduit end, a second conduit end, a first coupling and a second coupling. The fluid conduit extends axially along a centerline from the first conduit end, through the aperture and into the port to the second conduit end. The first coupling is mated with the first structure through the slider element. The second coupling is mated with the second structure through a cone seal interface.

14 Claims, 11 Drawing Sheets

(56) References Cited

U.S. PATENT DOCUMENTS

| | | | |
|---|---|---|---|
| 2011/0085895 A1* | 4/2011 | Durocher | F01D 9/065 |
| | | | 415/178 |
| 2013/0115079 A1* | 5/2013 | Farah | F01D 25/28 |
| | | | 415/214.1 |
| 2013/0189071 A1* | 7/2013 | Durocher | F02C 7/24 |
| | | | 415/1 |
| 2015/0338005 A1* | 11/2015 | Davis | F01D 9/065 |
| | | | 285/305 |
| 2016/0153315 A1 | 6/2016 | Kapustka | |
| 2017/0292449 A1 | 10/2017 | Agara et al. | |
| 2018/0224043 A1* | 8/2018 | Hendrickson | F16L 33/00 |

* cited by examiner

MONOLITHIC FLUID TRANSFER TUBE

This invention was made with Government support awarded by the United States. The Government has certain rights in this invention.

BACKGROUND OF THE DISCLOSURE

1. Technical Field

This disclosure relates generally to fluid transfer and, more particularly, to an assembly for transferring fluid in, for example, a fluid transfer system for a gas turbine engine.

2. Background Information

Various systems are known in the art for transferring fluid such as coolant, lubricant or fuel between components of a gas turbine engine. While these known systems have various advantages, there is still room in the art for improvement. For example, there is room in the art for a fluid transfer tube with a smaller, more compact form.

SUMMARY OF THE DISCLOSURE

According to an aspect of the present disclosure, an assembly is provided for a piece of rotational equipment. This assembly includes a first structure, a second structure and a fluid transfer assembly. The first structure is configured with an aperture. The second structure is configured as or otherwise includes a port. The fluid transfer assembly includes a fluid conduit and a slider element. The fluid conduit is configured as a monolithic tubular body that includes a first conduit end, a second conduit end, a first coupling and a second coupling. The fluid conduit extends axially along a centerline from the first conduit end, through the aperture and into the port to the second conduit end. The first coupling is mated with the first structure through the slider element. The second coupling is mated with the second structure through a cone seal interface.

According to another aspect of the present disclosure, an assembly is provided for a gas turbine engine. This assembly includes an outer structure, an inner structure and a fluid transfer system. The outer structure is configured with an aperture. The inner structure is configured as or otherwise includes a port. The fluid transfer system includes a fluid conduit and a slider seal plate. The fluid conduit is configured as an unsegmented tubular body that includes an outer coupling and an inner coupling. The fluid conduit extends axially along a centerline through the aperture and into the port. The outer coupling is mated with the outer structure through the slider seal plate. The inner coupling is mated with the inner structure through a cone seal interface.

The slider element may be adapted to seal an annular gap between the fluid conduit and the first structure.

The slider element may be adapted to slide axially, relative to the centerline, along a cylindrical first surface of the fluid conduit. The slider element may be adapted to slide radially, relative to the centerline, along a second surface of the first structure.

The slider element may contact the cylindrical first surface.

The first structure may include a housing and a retaining ring. The housing may be configured with a recess formed in part by the second surface. The slider element may be captured in the recess by the retaining ring.

The cylindrical first surface may define a maximum diameter of the fluid conduit.

The slider element may be configured as an annular seal plate that lies in a plane perpendicular to the centerline.

The second coupling may be attached to the second structure by a threaded interface between the second coupling and the second structure.

The second coupling may include a frustoconical coupling surface. The second structure may include a frustoconical structure surface that contacts the frustoconical coupling surface at the cone seal interface.

The assembly may include an annular seal arranged between the second coupling and the second structure.

The first structure may be configured as or otherwise include an outer structure of a gas turbine engine. The second structure may be configured as or otherwise include an inner structure of the gas turbine engine.

The assembly may include a fluid source and a fluid receptacle. The fluid transfer assembly may fluidly couple the fluid source with the fluid receptacle.

The assembly may include a gas turbine engine lubrication system that includes the fluid source, the fluid receptacle and the fluid transfer assembly. The piece of rotational equipment may be a gas turbine engine.

The assembly may include a gas turbine engine fuel system that includes the fluid source, the fluid receptacle and the fluid transfer assembly. The piece of rotational equipment may be a gas turbine engine.

The assembly may include a gas turbine engine cooling system that includes the fluid source, the fluid receptacle and the fluid transfer assembly. The piece of rotational equipment may be a gas turbine engine.

The fluid transfer system may also include a fluid source and a fluid receptacle. The fluid conduit may fluidly couple the fluid source to the fluid receptacle.

The slider seal plate may be adapted to slide axially, relative to the centerline, along and contact a cylindrical surface of the fluid conduit. The slider seal plate may be adapted to slide radially, relative to the centerline, along and contact a planar surface of the outer structure.

The inner coupling may include a frustoconical coupling surface. The inner structure may include a frustoconical structure surface that contacts the frustoconical coupling surface at the cone seal interface.

The inner coupling may be attached to the inner structure by a threaded interface between the inner coupling and the inner structure.

The foregoing features and the operation of the invention will become more apparent in light of the following description and the accompanying drawings.

DETAILED DESCRIPTION

Figure 1:
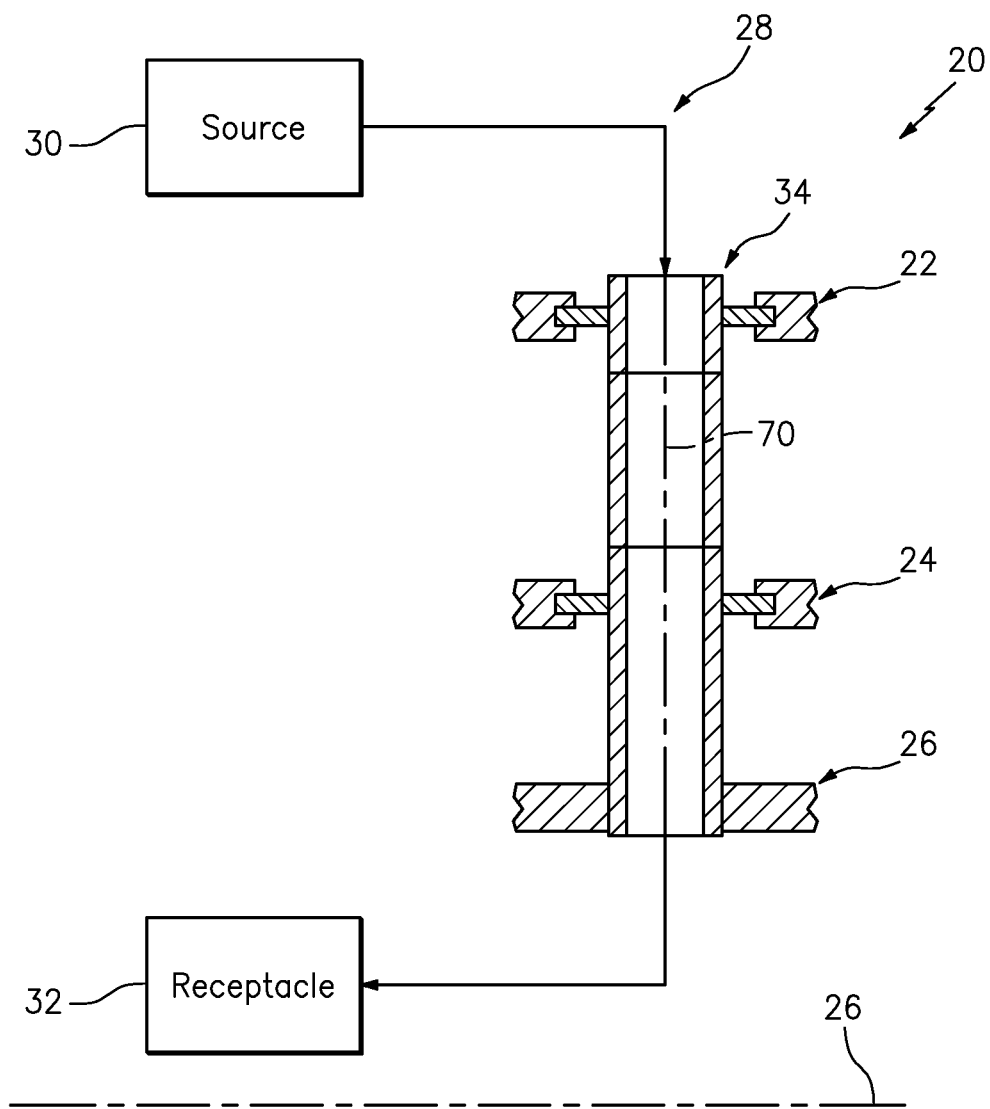
FIG. 1 is a schematic illustration of a portion of an assembly for a piece of equipment such as a gas turbine engine.

FIG. 1 is a schematic illustration of a portion of an assembly 20 for a piece of rotational equipment. For ease of description, this piece of rotational equipment may be referred to below as a gas turbine engine (e.g., see 174 in FIG. 16). The present disclosure, however, is not limited to any particular types or configurations of rotational equipment. The piece of rotational equipment, for example, may alternatively be configured as a wind, water or steam turbine, a rotary internal combustion engine or any other piece of rotational equipment that flows fluid; e.g., air, lubricant, fuel, coolant, etc. Furthermore, the disclosed assembly may also be configured for flowing fluid in non-rotational equipment.

The assembly 20 of FIG. 1 includes an outer structure 22, an intermediate structure 24, an inner structure 26 and a fluid transfer system 28; e.g., a lubrication, cooling and/or fuel system. This fluid transfer system 28 includes a fluid source 30 (e.g., a reservoir, pump, etc.), a fluid receptacle 32 (e.g., a bearing, nozzle, etc.) and a fluid transfer assembly 34 that fluidly couples the fluid source 30 to the fluid receptacle 32.

The outer structure 22 may be configured as a casing, a duct, a support or any other stationary structure of the rotational equipment. In one specific embodiment, the outer structure 22 extends axially along a rotational axis 36 of the rotational equipment. This outer structure 22 also extends circumferentially around the rotational axis 36, thereby providing the outer structure 22 with a full hoop body. The present disclosure, of course, is not limited to the foregoing exemplary outer structure configuration. For example, in other embodiments, the outer structure 22 may extend only partially circumferentially around the rotational axis 36. In still other embodiments, the outer structure 22 may be a discrete mount or support that is not annular, tubular nor arcuate.

The intermediate structure 24 may be configured as a casing, a duct, a support or any other stationary structure of the rotational equipment. In one specific embodiment, the intermediate structure 24 extends axially along the rotational axis 36. This intermediate structure 24 also extends circumferentially around the rotational axis 36, thereby providing the intermediate structure 24 with a full hoop body. The present disclosure, of course, is not limited to the foregoing exemplary intermediate structure configuration. For example, in other embodiments, the intermediate structure 24 may extend only partially circumferentially around the rotational axis 36. In still other embodiments, the intermediate structure 24 may be a discrete mount or support that is not annular, tubular and/or arcuate. Referring again to the specific embodiment above, the intermediate structure 24 is disposed radially within the outer structure 22 relative to the rotational axis 36.

The inner structure 26 may be configured as a casing, a duct, a support or any other stationary structure of the rotational equipment. In one specific embodiment, the inner structure 26 extends axially along the rotational axis 36. This inner structure 26 also extends circumferentially around the rotational axis 36, thereby providing the inner structure 26 with a full hoop body. The present disclosure, of course, is not limited to the foregoing exemplary inner structure configuration. For example, in other embodiments, the inner structure 26 may extend only partially circumferentially around the rotational axis 36. In still other embodiments, the inner structure 26 may be a discrete mount or support that is not annular, tubular and/or arcuate. Referring again to the specific embodiment above, the inner structure 26 is disposed radially within the outer structure 22 as well as the intermediate structure 24 relative to the rotational axis 36.

Figure 2:
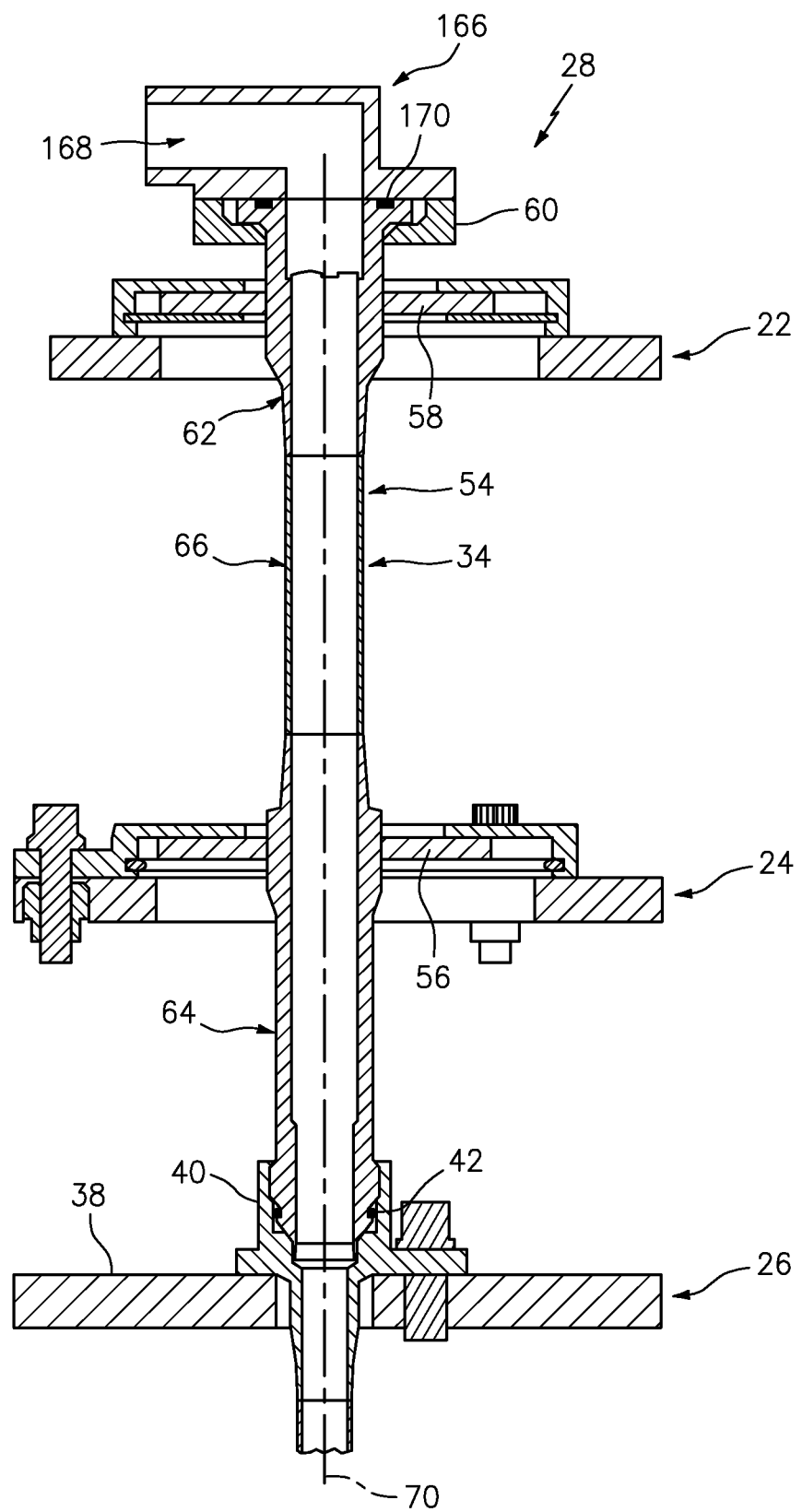
FIG. 2 is a sectional illustration of a portion of the assembly of FIG. 1.
Figure 3:
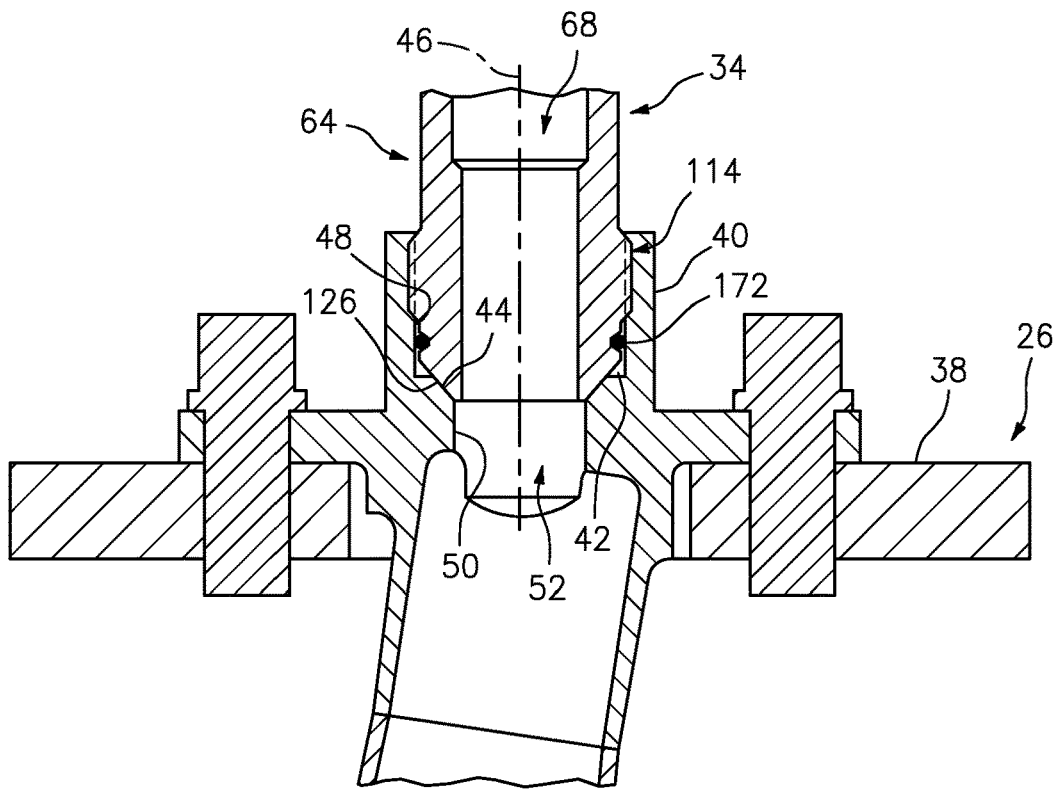
FIG. 3 is a sectional illustration of an interface between an inner structure and a fluid transfer tube for the assembly of FIG. 2.

Referring to FIG. 2, the inner structure 26 includes a base 38 and at least one tubular port 40 which projects out from and is connected (e.g., mechanically fastened) to the base 38. The port 40 completely (or partially) forms a coupling receptacle 42 for the fluid transfer assembly 34. Referring to FIG. 3, the coupling receptacle 42 includes a counterbore region and seal interface region. This seal interface region is configured with a frustoconical structure surface 44. This frustoconical structure surface 44 tapers radially inward, relative to a centerline 46 of the coupling receptacle 42, from a wall 48 of the counterbore region to a wall 50 of a fluid passage 52 in the inner structure 26. The frustoconical structure surface 44 is thereby offset from the centerline 46 and/or the wall(s) 48, 50 by an acute angle such as, but not limited to, exactly or approximately (e.g., +/−1°) thirty-seven degrees (37°).

Referring again to FIG. 2, the fluid transfer assembly 34 includes a fluid transfer tube 54 and one or more slider elements 56 and 58; e.g., annular seal plates, slider seal plates, etc. The fluid transfer assembly 34 of FIG. 2 also includes a mount 60; e.g., an annular mount.

Figure 4:
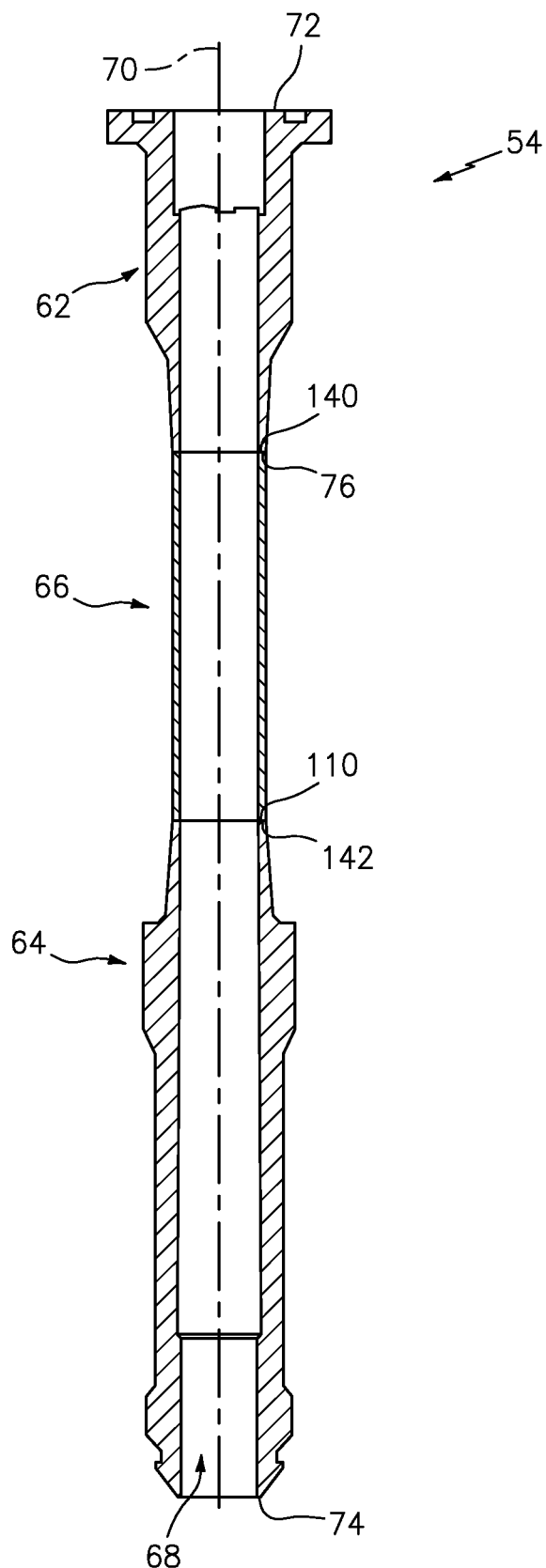
FIG. 4 is a sectional illustration of the fluid transfer tube.

Referring to FIG. 4, the fluid transfer tube 54 may be configured from a plurality of interconnected, discretely formed members; e.g., tubular bodies. The fluid transfer tube 54 of FIG. 4, for example, includes an axial outer end member 62 (e.g., a thick walled fluid conduit), an axial inner end member 64 (e.g., a thick walled fluid conduit) and an axial intermediate member 66 (e.g., a thin walled fluid conduit). The fluid transfer tube 54 has an inner bore 68. This inner bore 68 extends axially along a centerline 70 of the fluid transfer tube 54 through the fluid transfer tube 54 and each of its members 62, 64 and 66 from an outer tube end 72 of the fluid transfer tube 54 to an inner tube end 74 of the fluid transfer tube 54.

Figure 5:
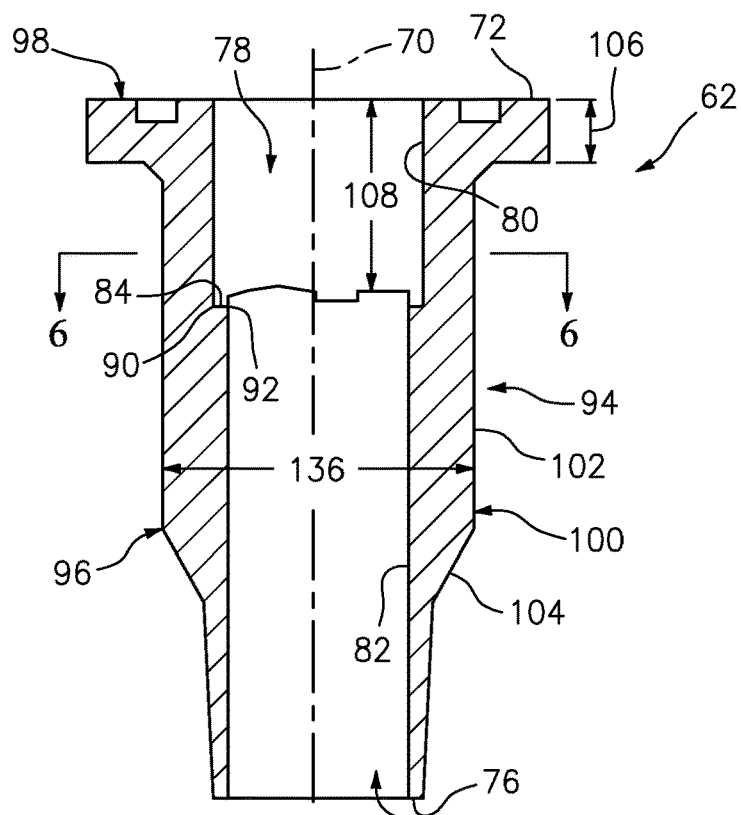
FIG. 5 is a sectional illustration of an outer end member of the fluid transfer tube of FIG. 4.

Referring to FIG. 5, the outer end member 62 extends axially along the centerline 70 from the outer tube end 72 to an inner end 76 of the outer end member 62. The outer end member 62 is configured with a tool receptacle portion 78 of the bore 68. The outer end member 62 of FIG. 5, for example, includes a first interior surface 80, a second interior surface 82 and at least one shelf surface 84. The first interior surface 80 and the at least one shelf surface 84 form the tool receptacle portion 78 at (e.g., on, adjacent or proximate) the outer tube end 72.

The first interior surface 80 extends axially along the centerline 70 from the outer tube end 72 towards the inner end 76 of the outer end member 62 and, more particularly, to the at least one shelf surface 84. The first interior surface 80 may be configured with a polygonal cross-sectional geometry when viewed in a plane perpendicular to the centerline 70; e.g., see FIGS. 6 and 7. In the specific embodiments of FIGS. 6 and 7, the polygonal cross-sectional geometry has an at least substantially square shape. For example, the polygonal cross-sectional geometry of FIG. 6 may have a substantially square shape where fillets 86 form small curves between the sides of the square. Alternatively, the polygonal cross-sectional geometry of FIG. 7 may have a square shape where the sides of the square meet at sharp corners 88. The present disclosure, however, is not limited to the foregoing exemplary square shape. For example, in other embodiments, the polygonal cross-sectional geometry may have an at least substantially triangular, hexagonal, pentagonal, octagonal or any other polygonal shape that substantially matches a shape of a tool to be inserted into the tool receptacle portion 78.

Figure 6:
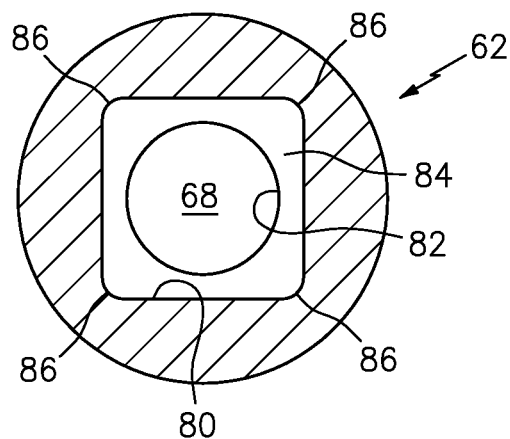
FIG. 6 is a cross-sectional illustration of the outer end member of FIG. 5 taken along line 6-6 in FIG. 5.
Figure 7:
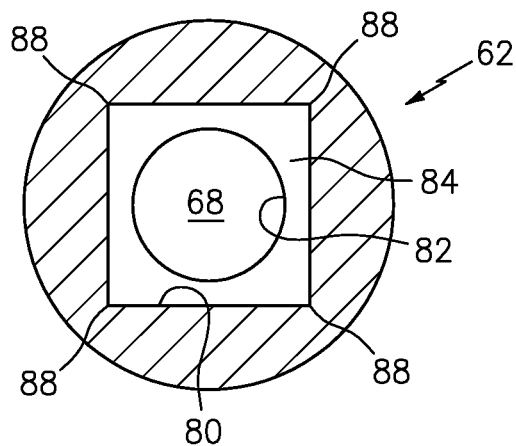
FIGS. 7 and 8 are cross-sectional illustrations of alternative outer end members.
Figure 8:
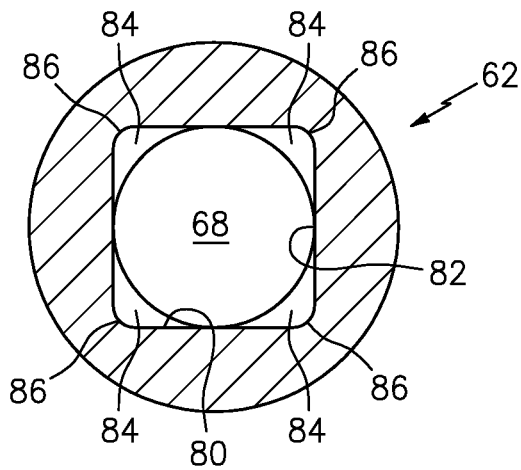

The at least one shelf surface 84 may be an annular surface as shown, for example, in FIGS. 6 and 7. However, in other embodiments, each shelf surface 84 may be a partially annular or other type of surface as shown, for example, in FIG. 8. Referring to FIG. 5, the at least one shelf surface 84 extends radially inward relative to the centerline 70 from a distal inner end 90 of the first interior surface 80 to a distal outer end 92 of the second interior surface 82.

The second interior surface 82 extends axially along the centerline 70 from the inner end 76 of the outer end member 62 towards the outer tube end 72 and, more particularly, to the at least one shelf surface 84. The second interior surface 82 may be configured with a circular cross-sectional geometry when viewed in a plane perpendicular to the centerline 70; e.g., see FIG. 6-8.

The outer end member 62 of FIG. 5 is configured as or otherwise includes an outer coupling 94. This outer coupling 94 includes a tubular base 96 and an annular flange 98. The base 96 extends axially along the centerline 70 from the outer tube end 72 to the inner end 76 of the outer end member 62. The base 96 thereby carriers the surfaces 80, 82 and 84. The base 96 also carriers an exterior surface 100 with a cylindrical portion 102 and a tapered portion 104. The cylindrical portion 102 axially overlaps the interior surfaces 80, 82 and 84. The tapered portion 104 tapers radially inward as the exterior surface 100 extends axially along the centerline 70 from the cylindrical portion 102 towards (e.g., to) the inner end 76 of the outer end member 62.

The flange 98 is arranged at (e.g., on, adjacent or proximate) the outer tube end 72. The flange 98 projects radially outward, relative to the centerline 70, from the base 96 to a distal flange end. The flange 98 is adjacent to the cylindrical portion 102 of the exterior surface 100. The flange 98 of FIG. 5 has an axial length 106 (e.g., a thickness) that is less than an axial length 108 of the tool receptacle portion 78.

In the embodiment of FIG. 5, the outer end member 62 is configured/formed as a monolithic tubular body; e.g., an un-segmented, unitary/integral body. The term "monolithic" describes herein a single body formed (e.g., cast, machined, additively manufactured, etc.) as a single mass of material. A non-monolithic body, by contrast, includes discretely formed segments which are mechanically fastened, bonded (e.g., welded, brazed and/or adhered) and/or otherwise attached together.

Figure 9:
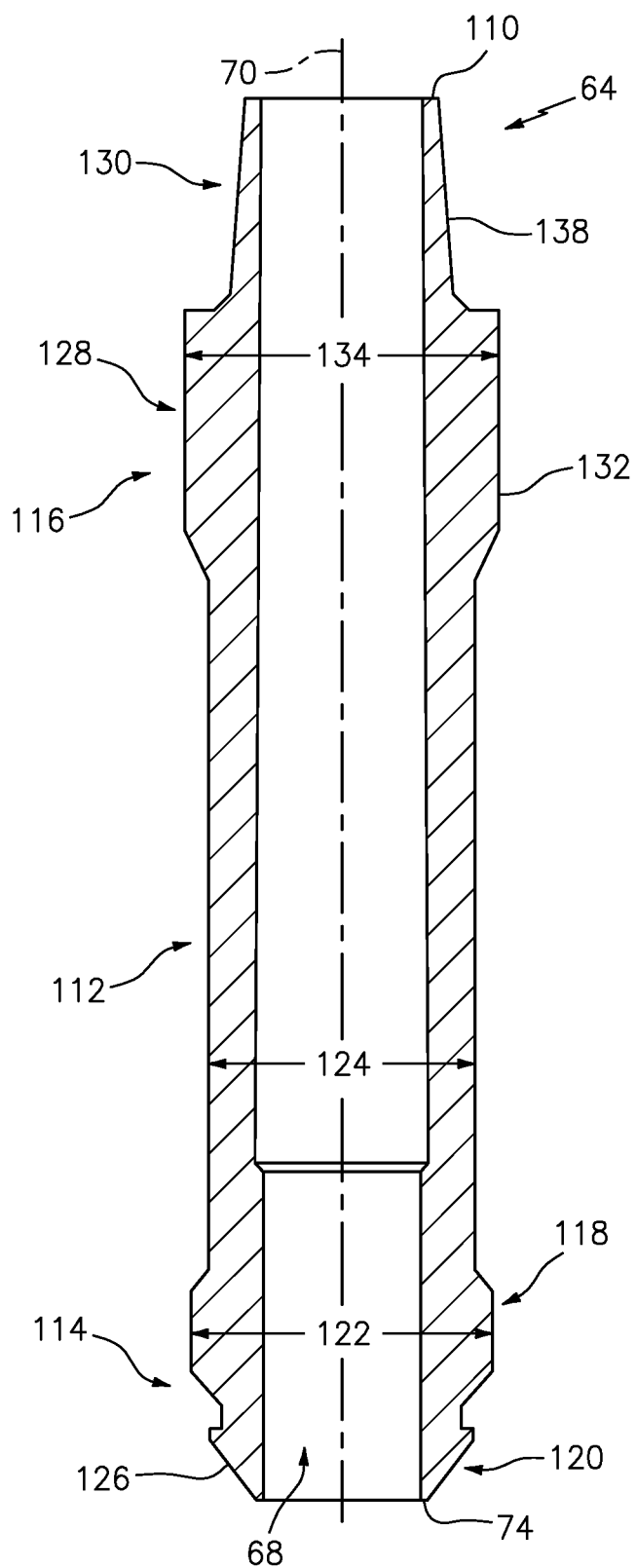
FIG. 9 is a sectional illustration of an inner end member of the fluid transfer tube of FIG. 4.

Referring to FIG. 9, the inner end member 64 extends axially along the centerline 70 from the inner tube end 74 to an outer end 110 of the inner end member 64. The inner end member 64 includes a tubular portion 112, a tubular inner coupling 114 and a tubular intermediate coupling 116. The tubular portion 112 includes a tubular sidewall that extends circumferentially around the centerline 70. The tubular sidewall extends axially along the centerline 70 between the inner coupling 114 and the intermediate coupling 116.

The inner coupling 114 is disposed at (e.g., on, adjacent or proximate) the inner tube end 74. This inner coupling 114 includes a threaded portion 118 and a seal interface portion 120. The threaded portion 118 defines a maximum width 122 (e.g., largest diameter) of the inner coupling 114. This maximum width 122 is sized to be greater than a maximum width 124 (e.g., largest diameter) of the tubular portion 112. The seal interface portion 120 is located between the threaded portion 118 and the inner tube end 74. The seal interface portion 120 is configured with a frustoconical coupling surface 126. This frustoconical coupling surface 126 tapers radially inward as the inner coupling 114 extends axially along the centerline 70 to or towards the inner tube end 74. The frustoconical coupling surface 126 is thereby offset from the centerline 70 by an acute angle such as, but not limited to, exactly or approximately (e.g., +/−1°) thirty-seven degrees (37°). This angle may be selected to correspond to the angle associated with the surface 44; see FIG. 3.

The intermediate coupling 116 is disposed at (e.g., on, adjacent or proximate) the outer end 110 of the inner end member 64. This intermediate coupling 116 includes a seal portion 128 and a coupling portion 130. The seal portion 128 includes a cylindrical outer surface 132. This outer surface 132 defines a maximum width 134 (e.g., largest diameter) of the intermediate coupling 116, which maximum width 134 is greater than the maximum width 122 of the inner coupling 114. This maximum width 134 may also be equal to or less than a maximum width 136 (e.g., largest diameter) defined by the base 96 of the outer end member 62; see FIG. 5. The coupling portion 130 projects axially out from the seal portion 128 along the centerline 70 to the outer end 110 of the inner end member 64. This coupling portion 130 may have an exterior surface 138 that tapers radially inward as the exterior surface 138 extends axially along the centerline 70 towards (e.g., to) the outer end 110 of the inner end member 64.

In the embodiment of FIG. 9, the inner end member 64 is configured/formed as a monolithic tubular body; e.g., an un-segmented, unitary/integral body.

Figure 10:
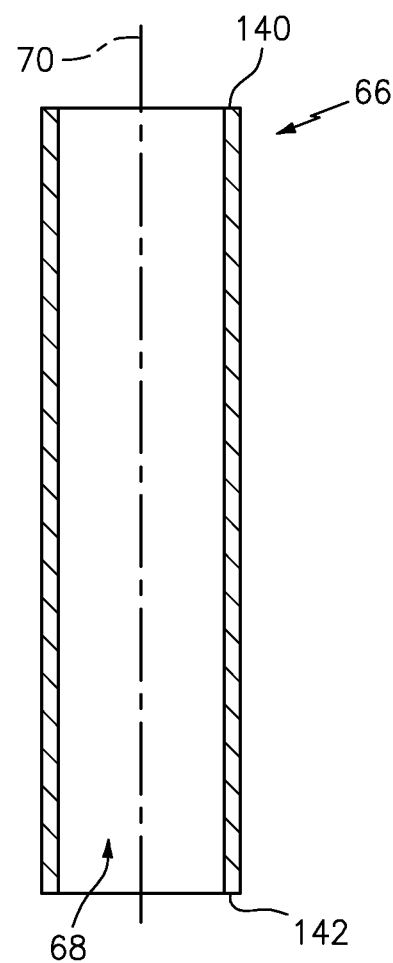
FIG. 10 is a sectional illustration of an intermediate member of the fluid transfer tube of FIG. 4.

Referring to FIG. 10, the intermediate member 66 extends axially along the centerline 70 between opposing ends 140 and 142 of that member 66. This intermediate member 66 has a substantially constant wall thickness that is less than an average wall thickness of each of the outer end member 62 and the inner end member 64.

In the embodiment of FIG. 10, the intermediate member 66 is configured/formed as a monolithic tubular body; e.g., an un-segmented, unitary/integral body.

Referring to FIG. 4, the outer end 140 of the intermediate member 66 is bonded (e.g., welded, brazed and/or adhered) to the inner end 76 of the outer end member 62. The inner end 142 of the intermediate member 66 is bonded (e.g., welded, brazed and/or adhered) to the outer end 110 of the inner end member 64. In this manner, various discretely formed monolithic bodies (the members 62, 64 and 66) are interconnected together to form a single rigid body; i.e., the fluid transfer tube 54.

The relative sizes of the maximum widths 122, 124, 134 and 136 described above enables the fluid transfer tube 54 to be passed sequentially through apertures in the outer structure 22 and the intermediate structure 24 and into the port 40 during installation (see also FIG. 2).

Figure 11:
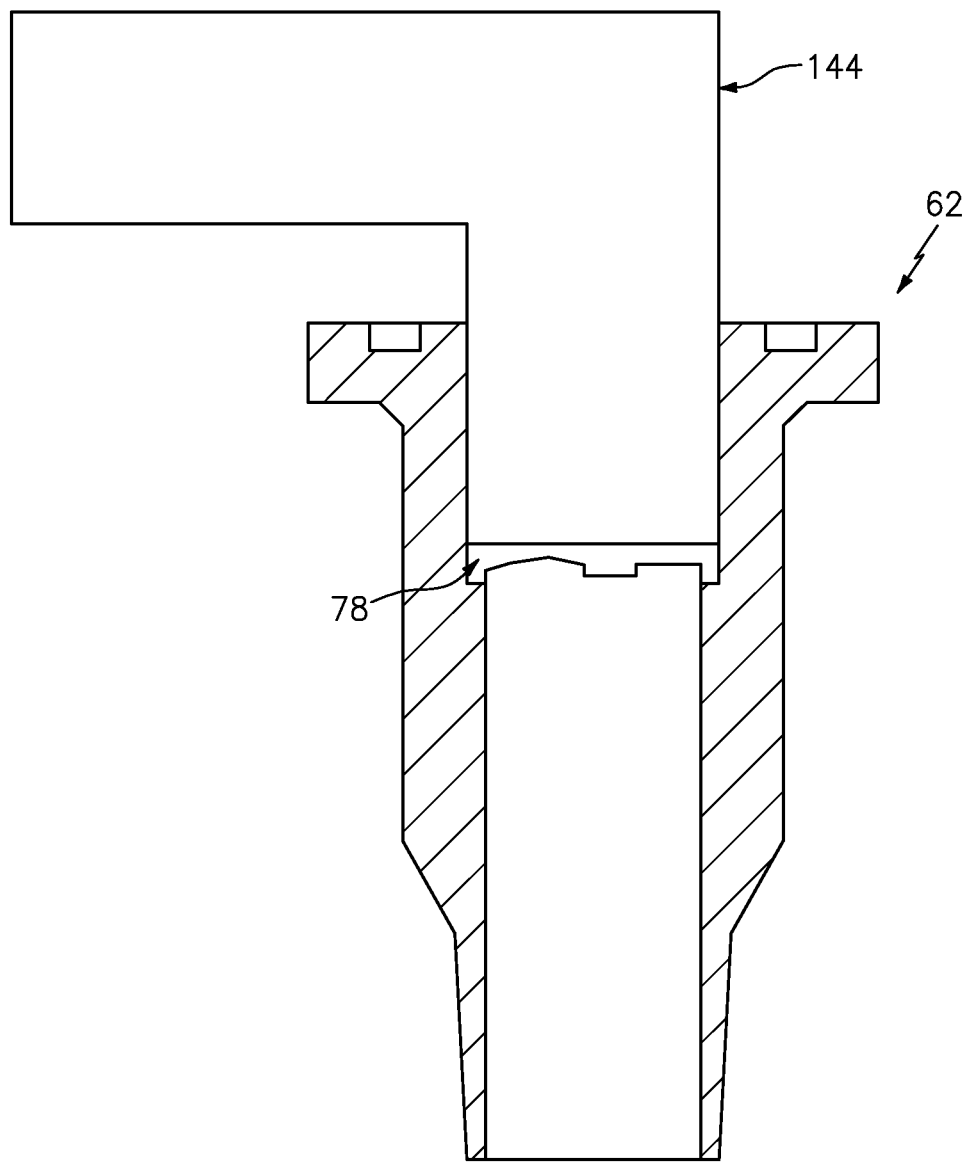
FIG. 11 is another sectional illustration of the outer end member of FIG. 5 arranged with a tool.

Referring to FIG. 3, the inner coupling 114 is inserted into and mated with (e.g., threaded into) the coupling receptacle 42 at a threaded interface such that the frustoconical coupling surface 126 engages (e.g., contacts) the frustoconical structure surface 44 so as to provide a cone seal interface therebetween. This cone seal interface is operable to form a complete seal between the fluid transfer tube 54 and the inner structure 26 to facilitate a fluid coupling between the bore 68 of the fluid transfer tube 54 and the fluid passage 52 of the inner structure 26, which fluid passage 52 is fluidly coupled with and leads to the fluid receptacle 32 (see FIG. 1). The term "complete seal" may describe a seal that substantially or completely prevents fluid leakage thereacross. By contrast, a partial seal may enable controlled fluid leakage thereacross. To facilitate the threading of the inner coupling 114 to the port 40, a tool 144 can be inserted into the tool receptacle portion 78 (e.g., see FIG. 11). Use of this tool 144 provides a means for screwing and torqueing the inner coupling 114 into the port 40.

Figure 12:
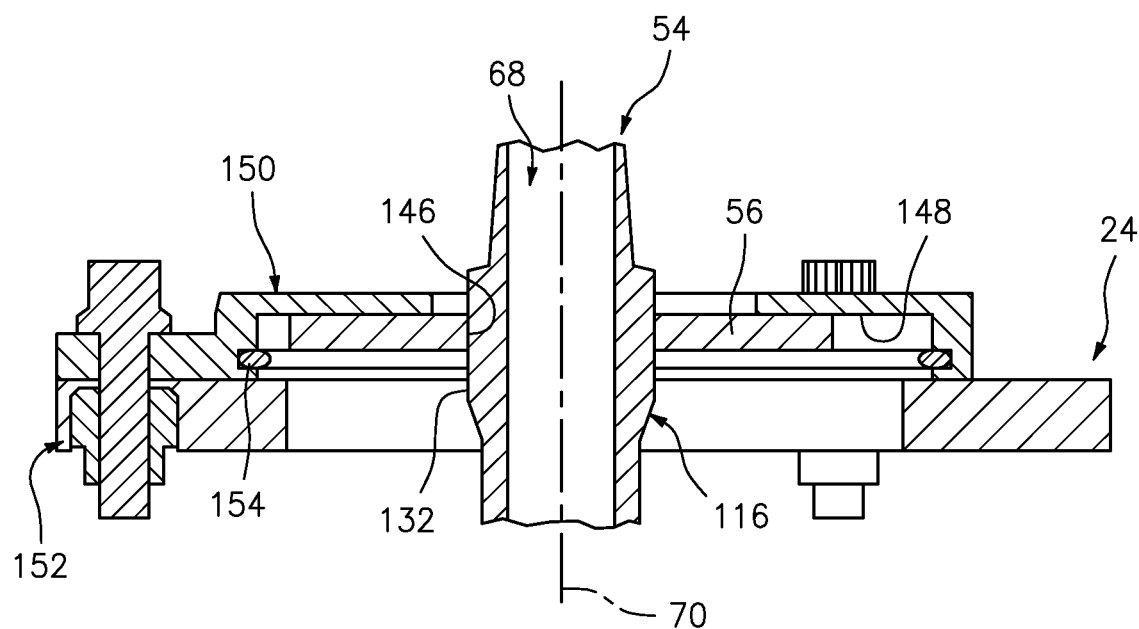
FIG. 12 is a sectional illustration of an interface between an intermediate structure and the fluid transfer tube for the assembly of FIG. 2.

Referring to FIG. 12, the intermediate coupling 116 projects axially along the centerline 70 through an aperture in the intermediate structure 24. The intermediate coupling 116 is mated with the intermediate structure 24 through the slider element 56. In particular, the intermediate coupling 116 projects axially along the centerline 70 through an aperture in the slider element 56. A surface 146 of the slider element 56 defining the aperture may be sized to contact and thereby form a seal with the cylindrical surface 132 of the intermediate coupling 116. The surface 146 may also be sized to enable the surface 146 to slide against the cylindrical surface 132. The slider element 56 may thereby slide axially along the cylindrical surface 132. The slider element 56 may also be adapted to slide radially along a (e.g., planar) surface 148 of the intermediate structure 24. This surface 148 may be carried by a housing 150 attached to a base 152 of the intermediate structure 24. In particular, the slider element 56 of FIG. 12 is seated within a recess in the housing 150 of the intermediate structure 24, and retained/captured within that recess by a retaining ring 154. The slider element 56 thereby provides a sealed interface (e.g., seals an annular gap) between the fluid transfer tube 54 and the intermediate structure 24, while also enabling slight (e.g., thermally and/or vibrationally induced) movement between the elements 24 and 54.

Figure 13:
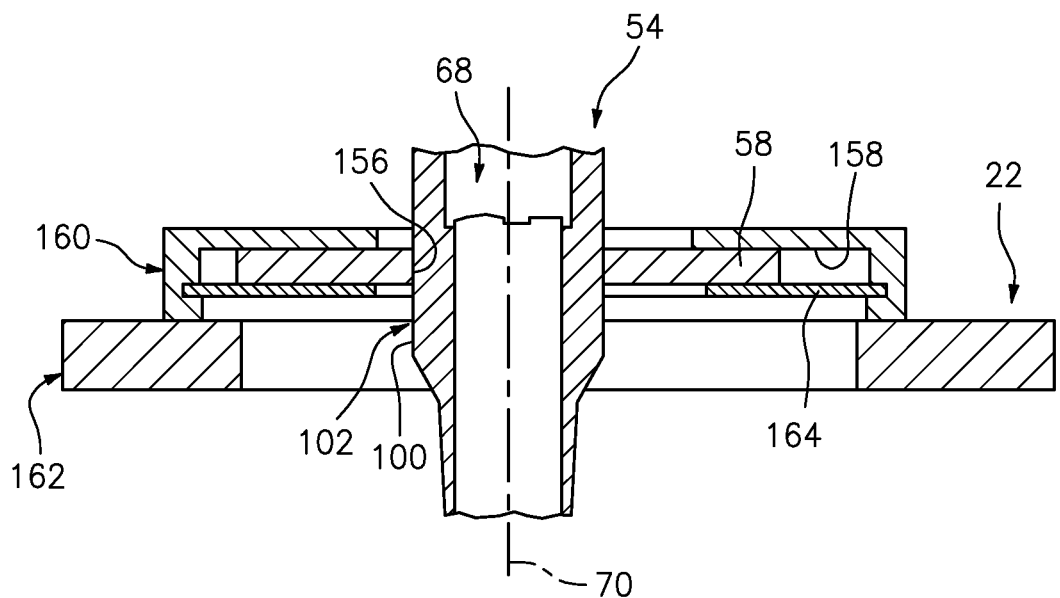
FIG. 13 is a sectional illustration of an interface between an outer structure and the fluid transfer tube for the assembly of FIG. 2.

Referring to FIG. 13, the outer end member 62 and its base 96 project axially along the centerline 70 through an aperture in the outer structure 22. The outer coupling 94 is thereby mated with the outer structure 22 through the slider element 58. In particular, the outer coupling 94 and its base 96 project axially along the centerline 70 through an aperture in the slider element 58. A surface 156 of the slider element 58 defining the aperture may be sized to contact and thereby form a seal with the cylindrical portion 102 of the surface 100 of the outer coupling 94. The surface 156 may also be sized to enable the surface 156 to slide against the cylindrical portion 102 of the surface 100; e.g., a cylindrical surface. The slider element 58 may thereby slide axially along the cylindrical portion 102 of the surface 100. The slider element 58 may also be adapted to slide radially along a (e.g., planar) surface 158 of the outer structure 22. This surface 158 may be carried by a housing 160 attached to a base 162 of the outer structure 22. In particular, the slider element 58 of FIG. 13 is seated within a recess in the housing 160 of the outer structure 22, and retained/captured within that recess by a retaining ring 164. The slider element 58 thereby provides a sealed interface (e.g., seals an annular gap) between the fluid transfer tube 54 and the outer structure 22, while also enabling slight (e.g., thermally and/or vibrationally induced) movement between the elements 22 and 54.

Figure 14:
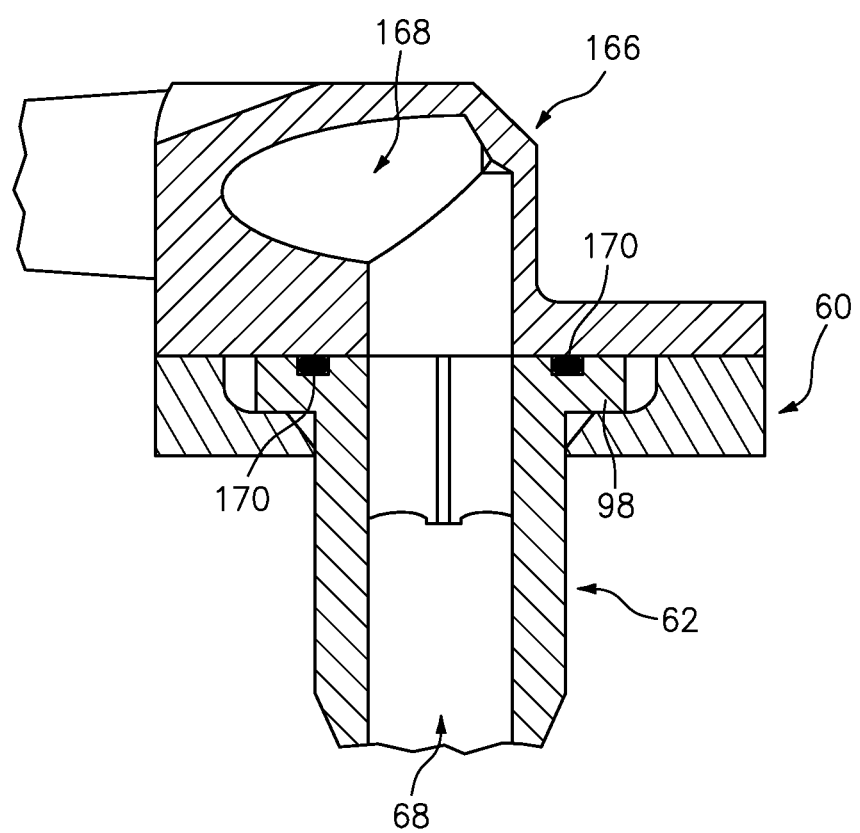
FIG. 14 is a sectional illustration of an interface between the fluid transfer tube and an additional component such as a coupling.
Figure 15:
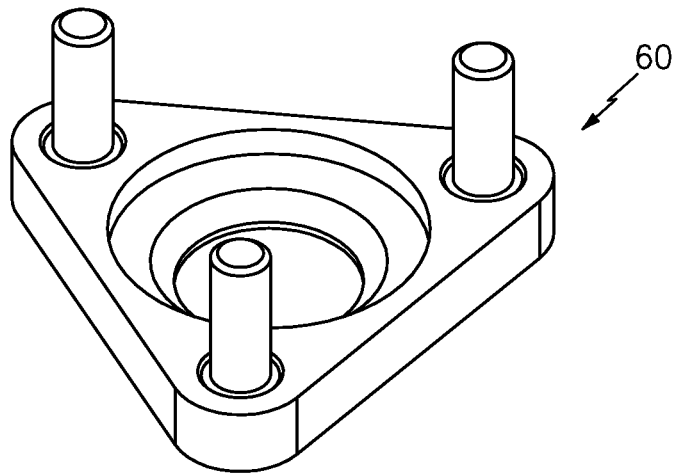
FIG. 15 is a perspective illustration of a mount for the interface of FIG. 14.

Referring to FIG. 14, the flange 98 is seated within a recess in the mount 60. Fasteners projecting out from the mount 60 (see FIG. 15) are mated with (e.g., inserted into) fastener apertures (not visible in FIG. 14) in an additional component 166 of the fluid transfer system 28; e.g., a coupling. Each fastener may receive a nut, which secures the component 166 to the mount 60. The flange 98 may thereby be sandwiched (e.g., clamped) between the elements 60 and 166 so as to fluidly couple the bore 68 with a fluid passage 168 in the component 166, which fluid passage 168 may be fluid coupled with and lead to the fluid source 30 (see FIG. 1).

The fluid transfer tube 54 described above has various advantages over other tube configurations, particularly configuration where an element similar to the inner end member 64 is formed by interconnected (e.g., bonded together) discrete segments. For example, configuring the inner end member 64 as a monolithic body enables provision of a more structurally sound body, particularly where interfacing with the intermediate structure 24 through the slider element 56. Configuring the inner end member 64 as a monolithic body also enables a more compact inner end member configuration. In another example, configuring the tool receptacle portion 78 into the bore 68 enables a more compact outer end member configuration.

In some embodiments, referring to FIG. 14, a seal element 170 (e.g., a ring seal) may be arranged between the elements 98 and 166 to facilitate a more complete sealed fluid coupling between the bore 68 and the passage 168.

In some embodiments, referring to FIG. 3, a seal element 172 (e.g., a ring seal) may be arranged between the elements 40 and 114 to facilitate a more complete sealed fluid coupling between the bore 68 and the passage 52.

In some embodiments, each slider element 56, 58 may be configured as an (e.g., annular) seal plate that lies in a plane perpendicular to the centerline 70.

Figure 16:
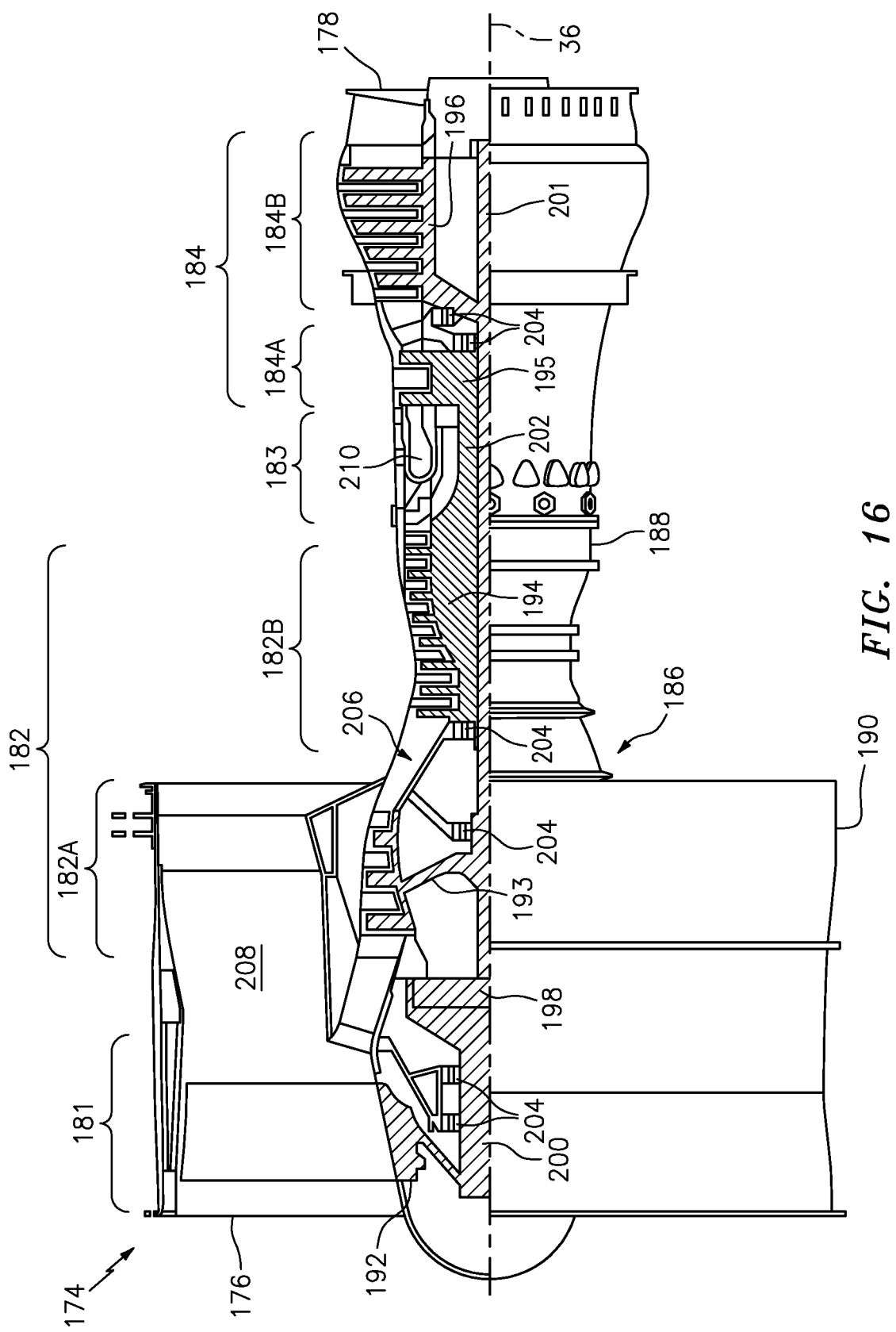
FIG. 16 is a side cutaway illustration of a gas turbine engine.

FIG. 16 is a side cutaway illustration of a geared gas turbine engine 174 with which the assembly 20 may be configured. This turbine engine 174 extends along the rotational axis 36 between an upstream airflow inlet 176 and a downstream airflow exhaust 178. The turbine engine 174 includes a fan section 181, a compressor section 182, a combustor section 183 and a turbine section 184. The compressor section 182 includes a low pressure compressor (LPC) section 182A and a high pressure compressor (HPC) section 182B. The turbine section 184 includes a high pressure turbine (HPT) section 184A and a low pressure turbine (LPT) section 184B.

The engine sections 181-184 are arranged sequentially along the axis 36 within an engine housing 186. This housing 186 includes an inner case 188 (e.g., a core case) and an outer case 190 (e.g., a fan case). The inner case 188 may house one or more of the engine sections 182-184 (e.g., the engine core). The outer case 190 may house at least the fan section 181.

Each of the engine sections 181, 182A, 182B, 184A and 184B includes a respective rotor 192-196. Each of these rotors 192-196 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 192 is connected to a gear train 198, for example, through a fan shaft 200. The gear train 198 and the LPC rotor 193 are connected to and driven by the LPT rotor 196 through a low speed shaft 201. The HPC rotor 194 is connected to and driven by the HPT rotor 195 through a high speed shaft 202. The shafts 200-202 are rotatably supported by a plurality of bearings 204; e.g., rolling element and/or thrust bearings. Each of these bearings 204 is connected to the engine housing 186 by at least one stationary structure such as, for example, an annular support strut.

During operation, air enters the turbine engine 174 through the airflow inlet 176. This air is directed through the fan section 181 and into a core gas path 206 and a bypass gas path 208. The core gas path 206 extends sequentially through the engine sections 182A-184B. The air within the core gas path 206 may be referred to as "core air". The bypass gas path 208 extends through a bypass duct, which bypasses the engine core. The air within the bypass gas path 208 may be referred to as "bypass air".

The core air is compressed by the compressor rotors 193 and 194 and directed into a combustion chamber 210 of a combustor in the combustor section 183. Fuel is injected into the combustion chamber 210 and mixed with the compressed core air to provide a fuel-air mixture. This fuel-air mixture is ignited and combustion products thereof flow through and sequentially cause the turbine rotors 195 and 196 to rotate. The rotation of the turbine rotors 195 and 196 respectively drive rotation of the compressor rotors 194 and 193 and, thus, compression of the air received from a core airflow inlet. The rotation of the turbine rotor 196 also drives rotation of the fan rotor 192, which propels bypass air through and out of the bypass gas path 208. The propulsion of the bypass air may account for a majority of thrust generated by the turbine engine 174, e.g., more than seventy-five percent (75%) of engine thrust. The turbine engine 174 of the present disclosure, however, is not limited to the foregoing exemplary thrust ratio.

The assembly 20 and/or its fluid transfer assembly 34 may be included in various turbine engines other than the one described above as well as in other types of rotational equipment. The assembly 20 and/or its fluid transfer assembly 34, for example, may be included in a geared turbine engine where a gear train connects one or more shafts to one or more rotors in a fan section, a compressor section and/or any other engine section. Alternatively, the assembly 20 and/or its fluid transfer assembly 34 may be included in a turbine engine configured without a gear train. The assembly 20 and/or its fluid transfer assembly 34 may be included in a geared or non-geared turbine engine configured with a single spool, with two spools (e.g., see FIG. 16), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

The terms "inner" and "outer" are used to orientate the components of the assembly 20 and/or its fluid transfer assembly 34 described above relative to the turbine engine 174 and its axis 36. A person of skill in the art will recognize, however, one or more of these components may be utilized in other orientations than those described above. The present disclosure therefore is not limited to any particular spatial orientations.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a piece of rotational equipment, comprising:
   a first structure configured with an aperture;
   a second structure comprising a port;
   a fluid source;
   a fluid receptacle; and
   a fluid transfer assembly including a fluid conduit and a slider element, the fluid transfer assembly fluidly coupling the fluid source with the fluid receptacle;
   the fluid conduit configured as a monolithic tubular body that includes a first conduit end, a second conduit end, a first coupling and a second coupling;
   the fluid conduit extending axially along a centerline from the first conduit end, through the aperture and into the port to the second conduit end;
   the first coupling mated with the first structure through the slider element; and
   the second coupling mated with the second structure through a cone seal interface.

2. The assembly of claim 1, wherein the slider element is adapted to seal an annular gap between the fluid conduit and the first structure.

3. The assembly of claim 1, wherein
   the slider element is adapted to slide axially, relative to the centerline, along a cylindrical first surface of the fluid conduit; and
   the slider element is adapted to slide radially, relative to the centerline, along a second surface of the first structure.

4. The assembly of claim 3, wherein the cylindrical first surface defines a maximum diameter of the fluid conduit.

5. The assembly of claim 1, wherein the slider element is configured as an annular seal plate that lies in a plane perpendicular to the centerline.

6. The assembly of claim 1, wherein the second coupling is attached to the second structure by a threaded interface between the second coupling and the second structure.

7. The assembly of claim 1, wherein
   the second coupling includes a frustoconical coupling surface; and
   the second structure includes a frustoconical structure surface that contacts the frustoconical coupling surface at the cone seal interface.

8. The assembly of claim 1, further comprising an annular seal arranged between the second coupling and the second structure.

9. The assembly of claim 1, wherein
   the first structure comprises an outer structure of a gas turbine engine; and
   the second structure comprises an inner structure of the gas turbine engine.

10. The assembly of claim 1, further comprising a gas turbine engine lubrication system comprising the fluid source, the fluid receptacle and the fluid transfer assembly, wherein the piece of rotational equipment is a gas turbine engine.

11. The assembly of claim 1, further comprising a gas turbine engine fuel system comprising the fluid source, the fluid receptacle and the fluid transfer assembly, wherein the piece of rotational equipment is a gas turbine engine.

12. The assembly of claim 1, further comprising a gas turbine engine cooling system comprising the fluid source, the fluid receptacle and the fluid transfer assembly, wherein the piece of rotational equipment is a gas turbine engine.

13. An assembly for a piece of rotational equipment, comprising:
   a first structure configured with an aperture;
   a second structure comprising a port; and
   a fluid transfer assembly including a fluid conduit and a slider element;
   the fluid conduit configured as a monolithic tubular body that includes a first conduit end, a second conduit end, a first coupling and a second coupling;
   the fluid conduit extending axially along a centerline from the first conduit end, through the aperture and into the port to the second conduit end;
   the first coupling mated with the first structure through the slider element;
   the second coupling mated with the second structure through a cone seal interface;
   the slider element adapted to slide axially, relative to the centerline, along a cylindrical first surface of the fluid conduit; and
   the slider element adapted to slide radially, relative to the centerline, along a second surface of the first structure;
   wherein the slider element contacts the cylindrical first surface.

14. An assembly for a piece of rotational equipment, comprising:
   a first structure configured with an aperture;
   a second structure comprising a port; and
   a fluid transfer assembly including a fluid conduit and a slider element;
   the fluid conduit configured as a monolithic tubular body that includes a first conduit end, a second conduit end, a first coupling and a second coupling;
   the fluid conduit extending axially along a centerline from the first conduit end, through the aperture and into the port to the second conduit end;
   the first coupling mated with the first structure through the slider element;
   the second coupling mated with the second structure through a cone seal interface;
   the slider element adapted to slide axially, relative to the centerline, along a cylindrical first surface of the fluid conduit; and
   the slider element adapted to slide radially, relative to the centerline, along a second surface of the first structure;
   wherein the first structure comprises a housing and a retaining ring;
   wherein the housing is configured with a recess formed in part by the second surface; and
   wherein the slider element is captured in the recess by the retaining ring.

* * * * *